United States Patent [19]

Hirai et al.

[11] Patent Number: 4,943,936
[45] Date of Patent: Jul. 24, 1990

[54] PRINT CONTROL APPARATUS CONTROLLING UTILIZATION STATE OF PLURAL FORMAT BLOCKS

[75] Inventors: Kenshi Hirai; Hiromichi Murakami, both of Hadano; Kikuo Hatazawa, Atsugi, all of Japan

[73] Assignee: Hitachi, Ltd., Tokyo, Japan

[21] Appl. No.: 143,090

[22] Filed: Jan. 12, 1988

[30] Foreign Application Priority Data

Jan. 29, 1987 [JP] Japan .................................. 62-17165

[51] Int. Cl.⁵ ................................................ G06F 3/12
[52] U.S. Cl. ...................................... 364/519; 400/76; 364/900
[58] Field of Search ... 364/200 MS File, 900 MS File, 364/519, 520; 400/61, 63, 67, 69, 76

[56] References Cited

U.S. PATENT DOCUMENTS 4,584,349  4/1986  Hardy ............................ 364/200
4,627,019 12/1986  Ng .................................. 364/900
4,658,351  4/1987  Teng ............................... 364/200

Primary Examiner—David L. Clark
Attorney, Agent, or Firm—Pennie & Edmonds

[57] ABSTRACT

A print control apparatus includes a page memory and a format memory respectively for receiving and storing a plurality of page data items and a plurality of format data entries which are supplied from a host computer, and is adapted to expand the corresponding page data and format data stored in the memories into dot data to perform overlay operation to thereby output the print data to a printer. The format memory is divided into a plurality of blocks, and the in-use and unused states of each of the blocks are controlled by a control table. The format data is prefetched into blocks in a free state detected by the control table, to thereby prevent the printing operation from being interrupted in case of changing the format data.

6 Claims, 5 Drawing Sheets

FIG. 5

| FORMAT CONTROL NO. | FORMAT ADDRESS | FORMAT COUNTER |
|---|---|---|
| 1 | 6000 | 1 |
| 2 | 0 | 0 |
| 3 | 5000 | 0 |
| 4 | 0 | 0 |
| 5 | 3000 | 2 |
| 6 | 0 | 0 |
| 7 | 0 | 0 |
| 8 | 0 | 0 |
| 9 | 1000 | 0 |
| 10 | 0 | 0 |

30 { (rows 1–10)
31 FORMAT CONTROL NO.
32 FORMAT ADDRESS
33 FORMAT COUNTER

FIG. 6

| Address | Block | Content |
|---|---|---|
| 0 | 0-TH BLOCK | USED FORMAT / FORMAT NOT STORED |
| 1000 | 1ST BLOCK | USED FORMAT |
| 2000 | 2ND BLOCK | USED FORMAT FOLLOWING 1ST BLOCK / FORMAT NOT STORED |
| 3000 | 3RD BLOCK | UNUSED FORMAT |
| 4000 | 4TH BLOCK | UNUSED FORMAT FOLLOWING 3RD BLOCK / FORMAT NOT STORED |
| 5000 | 5TH BLOCK | USED FORMAT |
| 6000 | 6TH BLOCK | UNUSED FORMAT |
| 7000 | 7TH BLOCK | UNUSED FORMAT FOLLOWING 6TH BLOCK / FORMAT NOT STORED |

14 FORMAT MEMORY

PRINT CONTROL APPARATUS CONTROLLING UTILIZATION STATE OF PLURAL FORMAT BLOCKS

BACKGROUND OF THE INVENTION

1. Field of the Invention

The present invention relates to a format overlay of a print control apparatus, and in particular, to a print control apparatus suitable for execution of a continuous printing operation while changing over between print formats.

2. Description of the Related Art

Heretofore, a print control apparatus of a printer using a continuous form accomplishes a successive printing of print data by use of an overlay operation of predetermined formats. In this operation, in order to enable the continuous printing even when change-over operations are achieved among a plurality of formats, the print control apparatus is provided with the formats stored in a format memory thereof. However, since the format memory is of limited capacity, thereof, the number of formats to be stored is accordingly restricted, and hence when this limit is exceeded, namely, when a format other than those stored in the format memory is used, a format replacement or change-over is necessary. Consequently, a processing wait state is required for the print control apparatus to change the format, which results in an interruption of the continuous printing.

As a prior art technology related to this kind of print control apparatus, there has been known technology described in the JP-A-60-22234, JP-A-57-58536, and the like. Referring now to the accompanying drawings, an example of the prior art technology will be described.

FIG. 1 shows a configuration of a print control apparatus according to the prior art technology, FIG. 2 is an explanatory diagram useful to explain states where page data are stored and read out in the conventional print control apparatus, and FIG. 3 is a schematic diagram showing an example of print results in relation to page data associated with a format change-over according to the prior art technology. The configuration of FIGS. 1-2 includes a channel adapter buffer 10, a page memory 11, a format entry 12, page data 13, a format memory 14, format data 15, dot expansion control sections 16-17, and a dot memory 18.

The print control apparatus according to the prior art technology comprises, as shown in FIG. 1, a channel adapter buffer 10 connected to channels of a host computer, a page memory 11 and a format memory 14 respectively storing page data 13 and format data 15 sent from the host computer linked to the channel adapter buffer 10, dot expansion sections 16-17 expanding into dot data the data respectively transmitted from the page memory 11 and the format memory 14, and a dot memory 18 storing the dot data received from the dot expansion sections 16-17.

Upon initiation of a print operation in the print control apparatus of FIG. 1, prior to transmission of print data, the host computer (not shown) sends a format address via the channel adapter buffer 10 to the page memory 11. The format address includes data indicating a format with which an overlay operation is to be achieved to print a page of print data to be transmitted later and is stored in a format entry 12 of the page memory 11. In the print control apparatus, a page of print data can be sequentially overlaid with a plurality of formats, thereby effecting data printing. Consequently, the host computer can transmit a plurality of format addresses associated with a page of print data, namely, the format entry 12 is configured to be capable of storing a plurality of format addresses.

When the format addresses are completely stored in the format entry 12, the host computer sends the format data 15 to the channel adapter buffer 10. The format data 15 is then fetched from the channel adapter buffer 10 so as to be stored at a location corresponding to the format address in the format memory 14.

Next, the host computer transmits print data to the channel adapter buffer 10. From the channel adapter buffer 10, the print data is fetched and is stored at a predetermined location of the page memory 11 in a page-by-page fashion. As a result, a page of the print data and the format address stored in the entry 12 are loaded as page data 13 in the page memory 11. When an operation to store a page of print data in the page memory 11 is finished as described above, the host computer stores a format address of the next page and print data in the format entry 12 and the page memory 11, respectively. In this operation, if a format to be overlaid is identical to that employed in an overlay operation on the print data of the previous page, the host computer stores only the print data in the page memory 11, so that the format address and format data are not re-transmitted. In this case, the format entry 12 associated with the print data of this page is loaded with a format address identical to that of the preceding page.

While the host computer is storing page data 13 in the page memory 11 as described above, if the page data 13 overflows the page memory 11, the new print data is written in areas of the page data 13 which have already been printed through a print operation (to be described later) beginning from an area thereof located nearest to the top of the page memory 11.

The page data 13 stored in the page memory 11 is printed as follows. Namely, the page data 13 stored in the page memory 11 and the format data 15 located in the format memory 14 indicated by a format address in the format entry 12 of the page data 13 are expanded in the dot representation by the dot expansion control sections 16 and 17, respectively and thereafter the resultant dot data are overlaid in the dot memory 18 for the storage and the dot data thus overlaid in the dot memory 18 are supplied to a printer.

Referring now to FIG. 2, description will be given of states where the page data 13 is stored and is read out at a certain point in the print control apparatus effecting the operation above.

In FIG. 2, it is assumed that page data 20 is already read out, that page data 21 (including page data 22, 23 and 24) has not been read out yet, page data 22 is being subjected to a dot expansion, that page data 23 contains the page data for the next page to be printed, and that page data 24 includes the latest page data stored in the page memory 11. In addition, a plurality of format addresses are assumed in be registered to the format entry 12 of the page data 22 currently being subjected to a dot expansion.

In the print control apparatus of FIG. 1, the print data of the page data 22 and the first format registered to the format entry 12 are overlaid in the dot memory 18, and the overlaid data is sent to the printer; thereafter, the next format registered to the format entry 12 is overlaid for the same print data. For the page data 22, when the last format registered to the format entry 12 is overlaid, the print control apparatus proceeds to processing of the next page data 23.

In a case where after the latest page data 24 is stored in the page memory 11, when storing print data of the next page, if format to be overlaid with the print data of the next page is missing from the format memory 14 and if no area for storing new format data is available in the format memory 14, the host computer will attempt to replace the stored format data with a new group of formats, including the format, to be used thereafter, in the format memory 14. The operation above is controlled in the print control apparatus as follows. After all page data is completely read out from the area of the page data 21, namely, upon completion of a print operation the data of a group of the new formats are stored in the format memory 14.

When the format change is finished, the host computer sequentially stores page data 13 associated with the format address and the print data in the page memory 11. The print control thereafter is accomplished such that the processing is restarted with the page data 24 for execution thereof.

FIG. 3 is a schematic diagram showing a processing example of the prior art, specifically, a print out operation in which the page data 22 and the format data 15 of FIG. 2 are processed according to the concrete print data and formats.

Format addresses 61-64 in the format entry 12 respectively correspond to format data 65-68, and the respective data are related to print forms shown in FIG. 3. The print data of the page data 22 is assumed to be a character string of "ABC". The diagrams 69-72 respectively represent results attained by overlaying the print data "ABC" with the format data 65-68.

As a result of the operation described in conjunction with FIG. 2, the overlaid results 69-72 are sequentially delivered to the printer, which then prints out the overlaid results 69-72 on the respective sheets of the print paper.

In the print control apparatus of the prior art, the format data must be frequently changed over and the transmission of dot data to the printer is interrupted while the format, data is being changed, which leads to a interruption of the print operation.

SUMMARY OF THE INVENTION

It is therefore an object of the present invention to provide improved print control apparatus with a high performance. The invention comprises the steps of a plurality of pages of print data and a plurality of formats and storing the received print data and formats in a memory, so as to edit print data. A format memory is subdivided into a plurality of blocks, each controllable to take a busy state and for an unused state thereof, depending on a control table, and format data is prefetched into such blocks when in a free state after usage thereof, so as to minimize the period of time necessary for an operation to change the format data, and preventing the print operation from being interrupted.

BRIEF DESCRIPTION OF THE DRAWINGS

The present invention will be apparent from the following detailed description taken in conjunction with the accompanying drawings in which:

FIG. 5 is a schematic diagram concretely showing a format control table; and

FIG. 6 is a schematic diagram showing states of the presence and absence of format storage for each block in the format memory depending on the format control table of FIG. 2.

DESCRIPTION OF THE PREFERRED EMBODIMENTS

Figure 1:
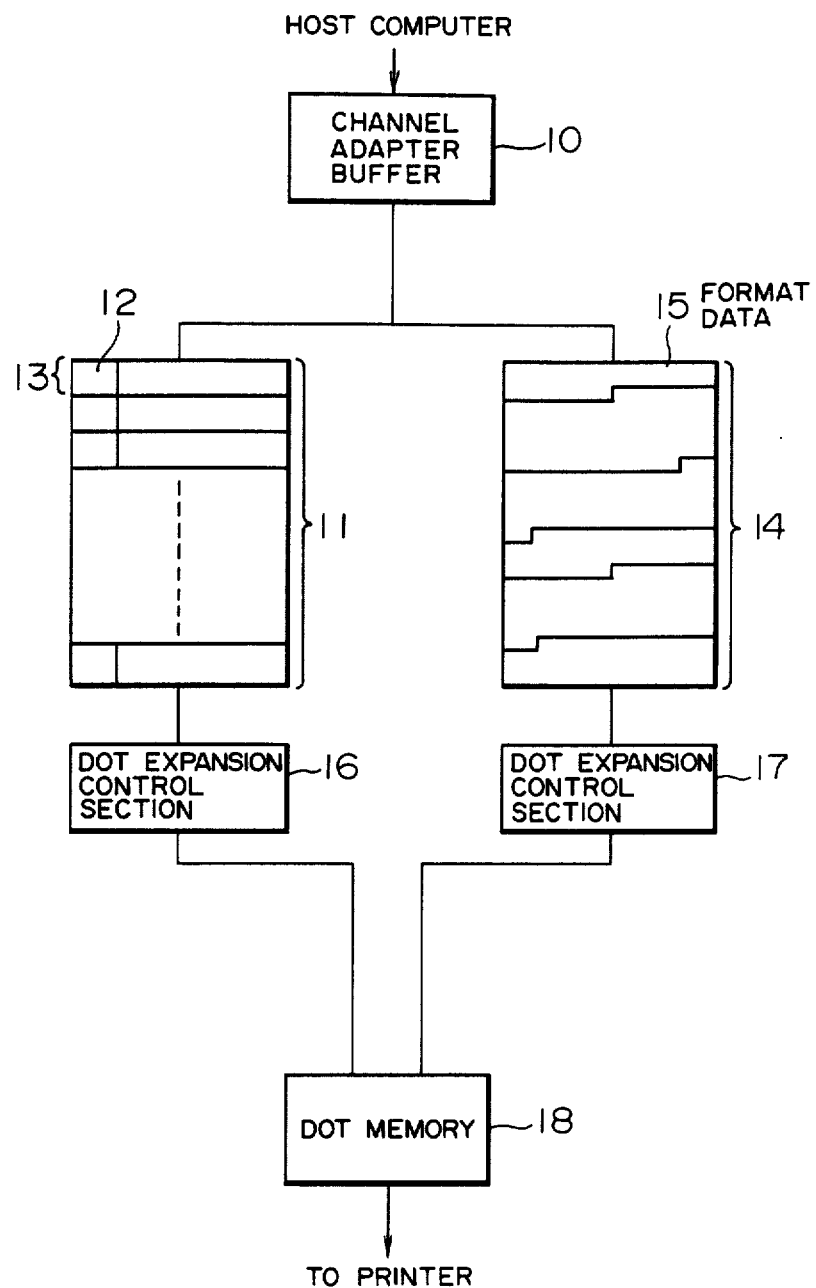
FIG. 1 is a configuration diagram of a print control apparatus according to the prior art.

Referring now to the drawings, description will be given in detail of an embodiment of the print control apparatus according to the present invention.

Figure 2:
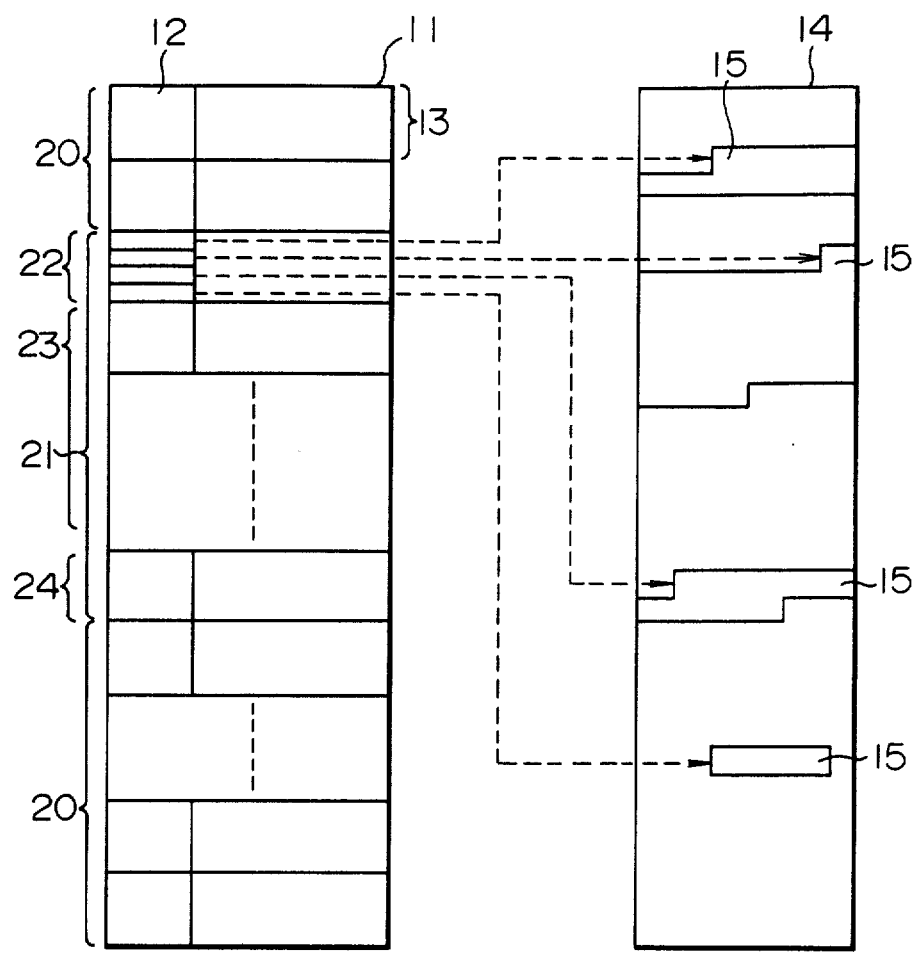
FIG. 2 is an explanatory diagram useful to explain states where page data is stored and read out in the prior art print control apparatus.
Figure 3:
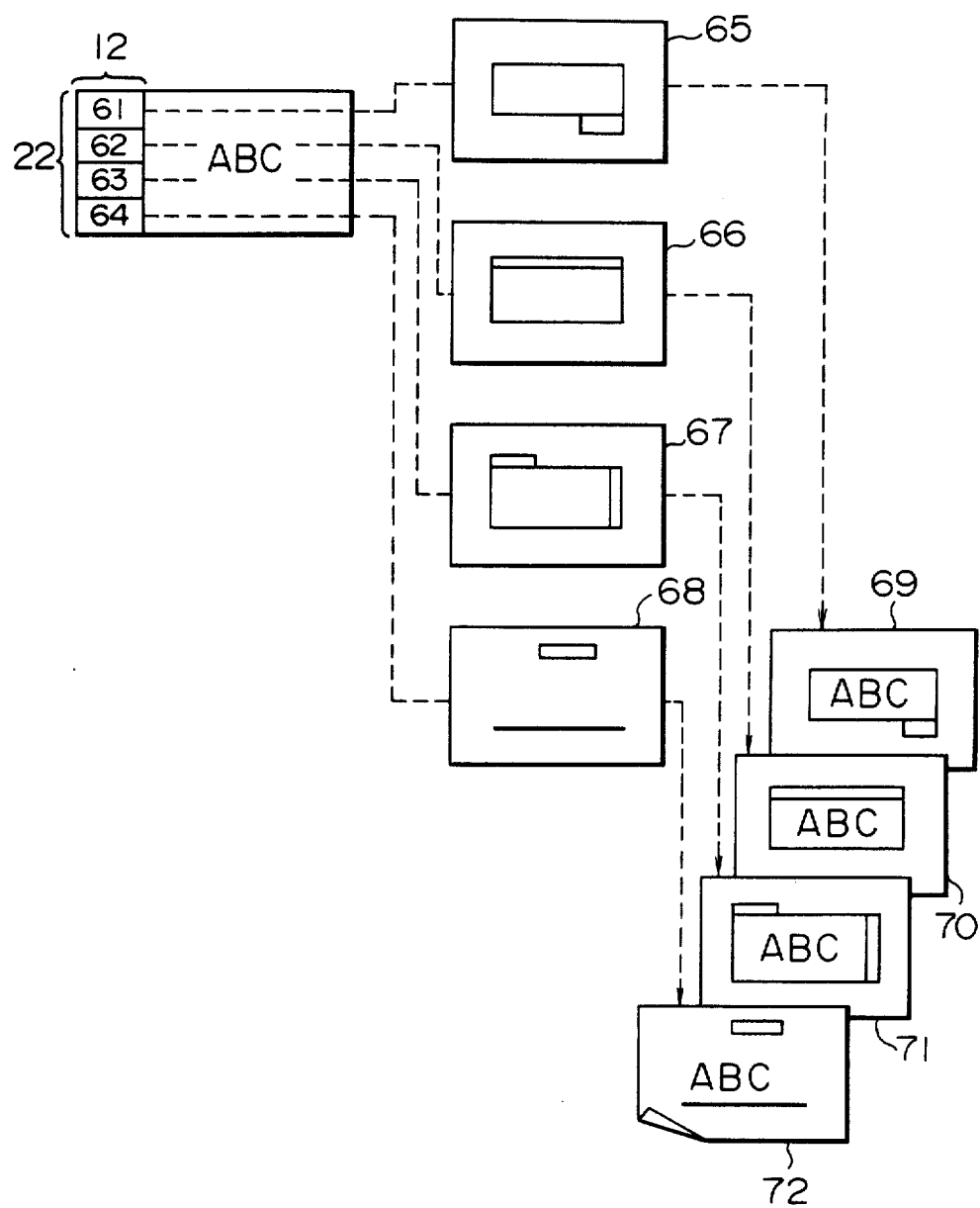
FIG. 3 is a schematic diagram illustrating print operations of the prior art technology in which print-out results are obtained by changing formats.
Figure 4:
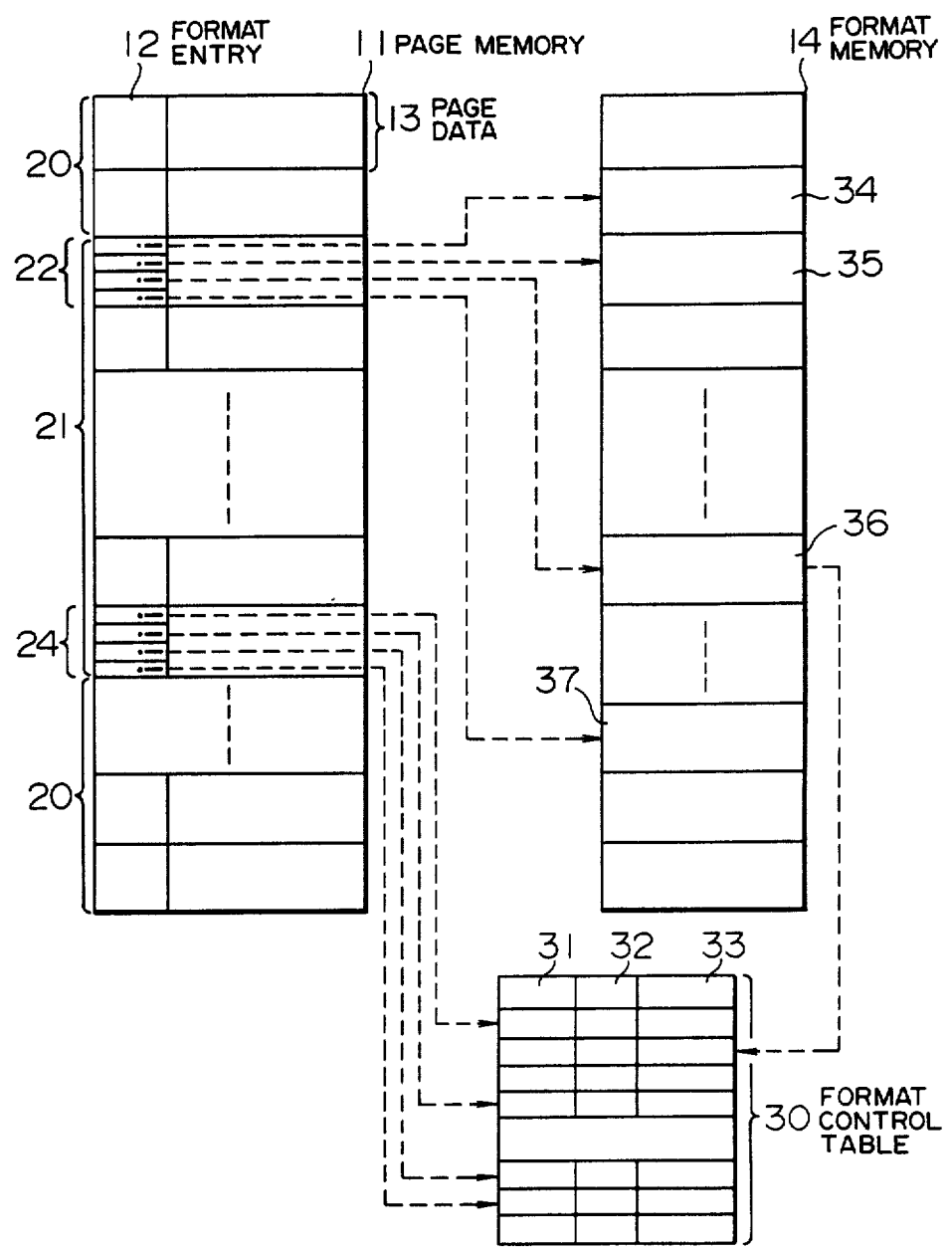
FIG. 4 is a conceptual diagram depicting an embodiment of the print control apparatus according to the present invention.

FIG. 4 is a diagram conceptually showing an embodiment of the present invention including a page memory 11, a format memory 14 subdivided into blocks each having a predetermined size, and a format control table 30. FIG. 5 shows a concrete example of the format control table, whereas FIG. 6 is a schematic diagram for explaining the decision of used/unused format data stored in each block of the format memory according to the concrete example of the format control table of FIG. 2. The configuration of FIG. 4 includes a format control table 30, a format control number field 31, a format address field 32, a format counter field 33, and other fields which are the same as those of FIGS. 1-2.

In the embodiment of FIG. 4 according to the present invention, the page memory 11 is used to store print data sent from the host computer in page-by-page fashion, and each page data item 13 comprises the format entry 12 and a page of print data. The format entry 12 is a field to which a format control number and a format address are registered. In a print operation, one of the format data entries stored in the format memory 14 is specified by a combination of the format control number and the format address. The control of the print operation is accomplished such that a page of print data in the page data 13 and the format data specified are expanded into the dot format so as to be subjected to a format overlay operation, in a manner essentially identical to the operation of the prior art described above. Furthermore, a plurality of pairs of format control numbers and format addresses can be registered to the format entry 12 so as to enable printing of a page of print data with a plurality of format data overlaid therewith, which is also the same as the operation of the prior art technology excepting that the format control number is registered to the format entry 12.

The format memory 14 is used to store therein format data transmitted from the host computer and is constituted by memory blocks. When storing format data, the host computer writes the format data beginning from the top of the each block. Consequently, the format address is identical to the first address of a block. When the format data to be stored has a size exceeding a block of the format memory 14, the host computer stores the format data in two successive blocks of the format memory 14; however, the host computer does not store a single item of format data in both the last block and the first block of the format memory 14.

The format control table 30 is disposed to control the used state and the unused state of the format data stored in the format memory 14 and is constituted by a number of blocks associated with the maximum number of formats necessary for the print job effected by the host computer. Each block of the format control table 30 includes a format control number field 31 to which a sequential control number is assigned beginning from the first block to the last block of the format control table 30, a format address field 32 to which a format address in the format entry 12 is registered, and a format counter field 33 indicating the utilization count of the format data. The format address field 32 and the format counter field 33 are respectively set to "0's" as initial values.

Next, a description will be given of the operation of the embodiment configured as described above according to the present invention. Excepting the page memory 11, the format memory 14, and the format control table 30, the configuration of the other components are the same as that of the prior art of FIG. 1.

First, the host computer sends a format control number and a format address to the page memory 11 so as to store the number and the address in the format entry 12 and thereafter stores format data in the format memory 14.

In a case where a plurality of format addresses are stored in the format entry 12, a plurality of format data corresponding to the format addresses are stored in the format memory 14. Next, the host computer transmits a page of print data to the page memory 11 so as to combine the print data with the format entry 12 in the page memory 11, thereby configuring page data 13. When a page of print data is completely stored in the page memory 11 as described above, print data for the next page is transmitted. If a format change is necessary for the print data of the next page, a format control number and a format address is again sent to form page data 13 in the page memory 11; otherwise, namely, if the same format is to be used again, only the print data is successively transmitted, and the format control number and the format address associated with the format entry 12 of the previous page are stored.

When a page of print data, a format control number, and a format address from the host computer are stored in the page memory, the print control apparatus of FIG. 4 transfers a format to the format control table 30. Namely, the content of the format entry 12 corresponding to the print data of this page is read out, the format counter field 33 of the block having the same control number as the format control number field in the format control table 30 is incremented by one, and the format address is written in the format address field 32. If the format entry 12 corresponding to the print data of this page comprises more than one pair of format control numbers and format addresses, similar processing is performed for all blocks of the format control table 30 having the same control number in the format control number field 31 as the stored format control numbers so as to effect the registration of format utilization.

The print operation of the page data 13 stored in the page memory 11 is accomplished such that a page of print data in the page data 13 and the format data 15 in the format memory 14 specified by the format address in the format entry 12 are expanded in the dot format so as to be subjected to an overlay operation, and the overlaid dot data is sent to the printer. In this operation, the content of the format counter field 33 of the block in the format control table 30 having the control number of the format used for the print data supplied to the printer is decremented by one.

Furthermore, description will be given in detail of the operation of the print control apparatus above according to the present invention in cases where the page data 13 is stored and is read out and where the format data is read out.

In the embodiment of FIG. 4, assume that the print data of the page data 22 in the page memory 11 is expanded in the dot format by use of the format data 34-37, that the format data 34-35 have already been subjected to the dot expansion and have already been read out, that the format data 36 has already been subjected to the dot expansion, and the format data 37 is being subjected to the dot expansion. In this case, when dot expansion information obtained by overlaying the format data 36 and the print data of the page data 22 is completely transmitted to the printer, the print control apparatus decrements the content of the format counter 33 of the corresponding block in the format control table 30. Moreover, when the print data of the page data 22 is overlaid with the format data 37 so as to effect dot expansion of the resultant data and the expaned data is sent to the printer, the print control apparatus similarly processes the blocks in the format control table 30 corresponding to the format data 37.

On the other hand, when the page memory 11 is loaded with the format entry 12 including a format control number and a format address and the latest page 24 comprising the format entry 12 and the print data from the host computer, a format address in the format entry 12 is written, based on the format control number in the format entry 12, in the format address field 32 of the corresponding block in the format control table 30, and thereafter the format counter is incremented by one. In a case where a plurality of format data exist for a page of print data, this processing is effected for all of the corresponding format counters 33 in the format control table 30. Successively, the host computer attempts to load print data for the next page in an area of the page data 20 which has already been read out and which is following the latest page data 24. In this situation, if format data associated with the print data of the next page is missing in the format memory 14, the format data must be changed.

In this case, the host computer reads the format control table 30 to locate, according to a method to be described later, a block of the format memory 14 which has already been read and in which a used format is stored. When the objective block is found, the control number and the first address thereof are stored in the page memory 11 as a format entry 12 corresponding to the print data of the next page; furthermore, the new format data is stored in the block already read out in the format memory 14. In this operation, if the format address field 32 of the respective block of the format control table 30 is associated with a block containing an address identical to the first address of the block in which the format data has been stored, "0" is set to the format address field 32, thereby preventing the same address from existing in two blocks.

Next, referring to the concrete example of the format control table 30 of FIG. 5, description will be given of the method of judging the used format data and the unused format data in the respective blocks of the format memory 14. FIG. 6 shows the state of the format memory used to judge the used format data and the unused format data in the respective blocks of the format memory 14. Incidentally, for convenience of explanation, the format memory 14 is assumed to comprise eight blocks each including 1000 bytes.

In a case where the format control table 30 contains data as shown in FIG. 5, the blocks of the format memory 14 for which the value of the format counter is other than "0", namely, the sixth block and the third block of the format memory 14 (FIG. 6) respectively having the first addresses 6000 and 3000, are loaded with unused format data, to be processed when the page data 21 not read out in the page memory 11 of FIG. 4 is printed. By comparison, the blocks of the format memory 14 for which the value of the format counter is "0" and which are indicated by the respective format addresses, namely, the fifth block and the first block of the format memory respectively having the first addresses 5000 and 1000, are loaded with used format data which has been used to print the page data 20 already read out from the page memory 11 of FIG. 4, and are not scheduled for another use thereafter. Furthermore, the other blocks of the format memory 14 are classified into blocks in which formats are not stored or blocks containing format data following the preceding block.

When writing new format data in the format memory 14, the host computer performs checking as indicated above to search for a block of the format memory 14 which is not loaded with a format, or for a block thereof which contains used format data, and stores the new format data in the block thus found. That is, in the case of FIG. 5, the host computer cannot store the new format data in the third and sixth blocks. Moreover, the size of the format data contained in the third and sixth blocks is checked, and if the format data exceeds 1000 bytes so that the next block must be used for the storage thereof, the fourth and seventh blocks cannot be loaded with the new format data, either. Naturally, if each format data stored in the third and sixth blocks has a size less than 1000 bytes, the host computer could load the new format data in the fourth and seventh blocks. Furthermore, if the size of the new format data exceeds 1000 bytes, the data is stored in two successive blocks. In the case of this example, if the size of the format data stored in the third and sixth blocks is less than 1000 bytes, the data can be stored in the second block or the fourth and fifth blocks.

In addition, in the example of FIG. 5, it cannot be determined whether or not the 0-th block of the format memory 14 contains format data; however, assuming that the format data cannot be written continuing the last block to the first block, it is possible to determine that the 0-th block contains used format data or does not store format data, which enables the host computer to store the new format data in the 0-th block.

According to the embodiment of the present invention, when new format data is required to be written in the format memory, the host computer checks the format control table to search for a block in the format memory which contains used format data or in which format data has not been stored, so as to write the new format data to the block thus located. This feature enables the host to store necessary format data in the format memory 14 at any time. As a result, the print control apparatus according to the embodiment of the present invention eliminates interruption of the printing of page data for a change of the format data in the format memory, and hence can effect a continuous print operation.

According to the present invention as described above, the format data to be overlaid with print data can be stored in as many items as necessary in the format memory, which enables it to provide a high-performance print control apparatus eliminating interruption of the print operation.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

What is claimed is:

1. A print control apparatus comprising:
   a format memory for storing a plurality of format data entries supplied from a host computer, said format memory being subdivided into a plurality of blocks;
   a page memory for storing a plurality of print data items and corresponding first information items, said first information items representing, for each print data item, one of said format data entries stored in said format memory to be overlayed with the corresponding print data items, said print data items and first information items being supplied form said host computer;
   printing means connected to said format memory and said page memory for overlaying and printing the print data items according to the format data entry represented by said first information items associated with the print data items; and
   a format control table connected to said format memory for storing a plurality of second information items corresponding to the blocks in said format memory, each of said second information items indicating the status of a format data entry stored in the corresponding block;
   wherein said host computer stores new format data entries into said blocks in the format memory in accordance with the status of said block indicated by the corresponding second information items stored by said format control table.

2. A print control apparatus according to claim 1, wherein each said second information item indicates whether the format data entry in the associated block is in an unused state, a used state or a non-stored state, and wherein the host computer stores the new format data entries into blocks storing format data entries which are indicated by said second information items to be in either the used or the non-stored state.

3. The method of controlling the transfer of print data and format data from a host computer to a printer, comprising the steps of:
   (a) reading a plurality of second information items stored in a format control table;
   (b) writing a format data item onto a format memory block having a format address corresponding to a second information item whose stored content indicates that said format memory block either stores no format data item or stores a used format data entry;
   (c) writing a first information item specifying the location of the format data item and the location of the second information item onto a page memory;
   (d) changing the content of said second information item to that said format memory block stores an unused format data item;

(e) writing a print data item onto the page memory for grouping said print data item with the first information item corresponding to the format data item which is used with said print data item in expansion to dot format;

(f) expanding the print data item and the corresponding format data item into dot format;

(g) subjecting the expanded print data item and corresponding format data item to an overlay operation;

(h) sending the overlaid dot data to a printer to be printed on tangible medium; and (i) changing the content of the second information item to indicate that the format memory block stores a used format data item.

4. The method of claim 3, wherein the step of changing the content of the second information item to indicate that said format memory block stores an unused format data item comprises the step of incrementing by one the content of the second information item; and wherein the step of changing the content stored in the format control field to indicate that said format memory block either stores no format data item or stores a used format data item comprises the step of:

decrementing by one of the content of the second information item.

5. The method of claim 3 wherein the steps of claim 5 are performed for a series of print data items and data format items, the commencement of the steps for each print data item and data format item beginning before the completion of the steps for the preceding print data items or format data items.

6. The method of claim 3 wherein the step of changing the content of the second information item to indicate that said format memory block stores an unused format data item comprises the step of changing the content of the second information item from a first state to a second state; and wherein the step of changing the content in the format control field to indicate that said format memory block either stores no format data item or stores a used format data item comprises the step of:

resetting the content of the second information item to the first state.

* * * * *